June 18, 1940.  A. L. JOHNSON  2,204,894
SEAT ADJUSTING MEANS
Filed May 16, 1938
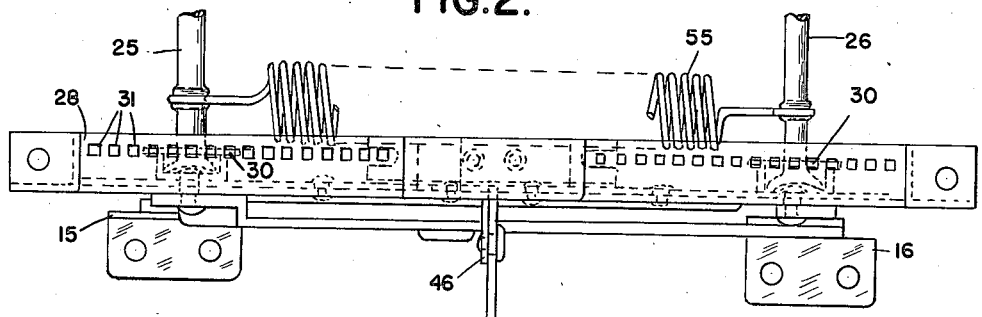
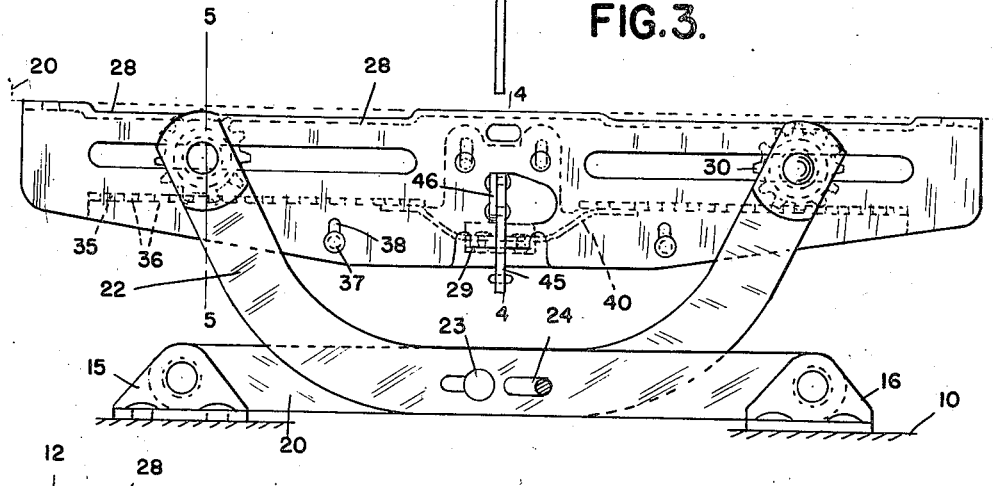
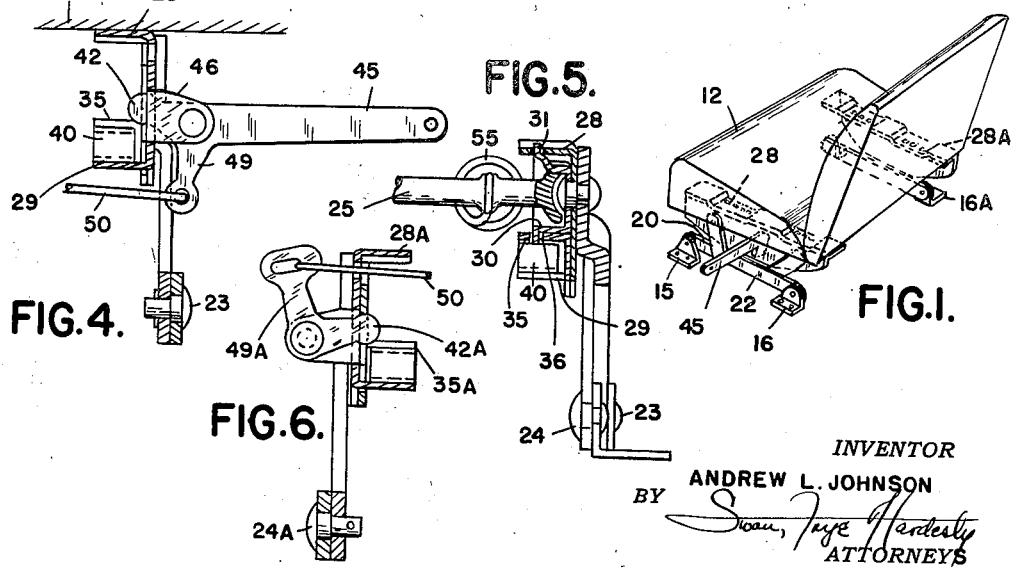
INVENTOR
ANDREW L. JOHNSON
BY
ATTORNEYS

Patented June 18, 1940

2,204,894

UNITED STATES PATENT OFFICE

2,204,894

SEAT ADJUSTING MEANS

Andrew L. Johnson, Pontiac, Mich., assignor to The American Forging & Socket Company, Pontiac, Mich., a corporation of Michigan Application May 16, 1938, Serial No. 208,133

3 Claims. (Cl. 155—91)

This invention relates to adjustable supporting mechanisms. Although not restricted as to the nature of the supported object, it is particularly concerned with and disclosed as applied to the supporting of vehicle seats, for the reason that supporting devices for such purposes present special and difficult problems. They must be inexpensive and simple in their construction and installation, must stand considerable loads for long periods of time, which loads may be applied unevenly, to different parts of the supporting assembly at different times, and often in the form of sudden and severe shocks. They must be easily and freely movable for adjustment, yet must not allow lost motion, vibration or rattling when locked in one position. They must function perfectly for long periods of time without lubrication or other attention and must be of such nature that dirt and foreign matter cannot cause trouble or jamming. When in addition it is considered that they must be freely adjustable by effort applied entirely at either end of the seat, and for reasons of economy must be constructed of stamped sheet metal or other equally inexpensive parts, the territory encompassed by the objects of the present invention will be appreciated when it is stated that such objects may be summarized as comprising the provision of a cheap and simple adjustable seat supporting mechanism embodying all of such desirable features.

An additional object is to provide such a supporting assembly which allows changing the height as well as the position of the supported seat, and in which the weight of the load is counterbalanced to such extent as to allow very easy adjustment both of height and position.

A further object is to provide such a supporting mechanism having common locking means which normally holds the seat or other supported object against adjustive movement either in position or height, and common operating mechanism for such locking means, which, despite releasing the seat entirely, for movement in either manner, allows the same to be independently adjusted either vertically or horizontally.

In the drawing:

Figure 1 is a perspective view of a vehicle seat carried upon supporting mechanism constructed in accordance with the present invention.

Figure 2 is a plan view of the two assemblies comprising the entire supporting mechanism.

Figure 3 is a side elevational view of such assembly.

Figures 4 and 5 are sectional details taken respectively on the lines 4—4 and 5—5 of Figure 3, and looking in the direction of the arrows.

Figure 6 is a sectional detail of the latch mechanism of the other supporting assembly, corresponding to Figure 4.

Referring now to the drawing, in which reference character 10 designates the floor of a vehicle, fragmentarily shown and illustrating a supporting surface, a seat 12, to be carried thereupon is indicated as attached to the floor by brackets 15, 16, bolted or otherwise rigidly held down. One bracket is arranged beneath each corner of the seat, the upwardly extending flanges of the brackets lying parallel to the line of longitudinal seat movement. Since the supporting assemblies at the two ends of the seat may be of like construction except for differences relating to the locking mechanism, which will be noted, detailed description of one assembly only will suffice.

From each forward bracket 15 a leg 20 extends rearwardly and upwardly to support the rear corner of the seat, while a similarly shaped leg 22 extends forwardly and upwardly from the rear bracket 16, to support the front corner of the seat. Each leg is pivoted to its supporting bracket for swinging movement in a vertical plane. The portions of the legs which cross each other are in slidable engagement, and their movement with respect to each other is guided and limited by pin and slot connections 23, 24.

A pair of shafts 25, 26 are journaled in the upwardly projecting ends of the legs, each shaft extending across to the opposite assembly at the other end of the seat. The shafts are journaled in the corresponding legs of the two assemblies, and a combined roller-gear member 30 is fast upon each shaft near each end. As best shown in Figure 5, each roller-gear member comprises a cupped sheet metal element having a substantially cylindrical periphery integral with its supporting web at one end, and carrying at its other end radially outwardly projecting gear teeth. A carriage member 28 is supported by the rollers and serially perforated as at 31 to provide rack portions meshing with the gear teeth. The gear and shaft connection thus provided between the opposite ends of the seat insures uniform movement of the two ends and prevents any unwanted turning of the seat about a vertical axis.

The locking means which normally holds the seat against movement merely locks the gears against rotation. Such locking means prevents the carriage from sliding, and at the same time prevents the gears from rolling toward or from each other. Such movement of the gears toward or from each other, which is possible when the locking means is released, changes the height of the seat by swinging the ends of the links upwardly and toward each other or downwardly and away from each other, as the case may be.

A locking plate 35 has a horizontal flange with similar serial perforations 36 for engagement with the teeth of the roller-gear elements. The locking plate is vertically movable to and from engagement with the gear teeth, but held against longitudinal movement with respect to the carriage, acting to hold the roller gear elements against turning when engaged therewith. The plate 35 is movably attached to the carriage by pins 37 on the carriage which extend through vertical slots 38 in the plate. A leaf spring 40 urges the locking plate upwardly into locking engagement with the gears, while such plate may be forced downwardly, against the effort of such spring, by means of a projecting cam portion 42 formed integrally with the operating handle 45, which is pivoted in outwardly projecting position upon an outturned lug 46 pressed from the body of the carriage. In the shown arrangement the cam portion so overlies the vertically movable locking plate that the latter may be forced downwardly to free the gears by lifting the outer end of the handle. The spring 40 is of the semi-elliptic leaf type, centrally supported by an inturned flange 29 carried by the carriage 28, the ends of the spring bearing upwardly against the vertically movable locking plate.

A crank portion 49 also formed integrally with the handle is connected by means of a link 50 with a similarly acting locking dog 42A pivoted in like fashion upon the opposite carriage 28A, the arrangement being such that when the handle 43 is lifted to depress the locking plate 35, the corresponding locking plate 35A of the opposite assembly is simultaneously depressed, all four of the rollers being thus freed at once.

Springs 55 are provided tending to draw the shafts 25, 26 toward each other, and so urging the ends of the supporting legs toward each other and upwardly, counterbalancing to a desired extent the weight of the seat and its load. The shafts are of course rotatable with relation to the attached ends of the springs.

When the locking plates are depressed by means of the handle 45, the seat may be slid toward the front or rear, but will not rise if sufficient weight is on it to offset the effect of the springs 55, while if the weight upon the seat is relieved, such release of the gears allows them to roll toward each other, and the seat rises. It will also be appreciated that the springs maintain such tension upon the parts as to prevent unwanted lost motion and rattling.

What I claim is:

1. Means for supporting a seat or the like comprising in combination with a suitable support, a pair of links swingable about spaced, fixed axes and crossing one another to swing in opposite directions, but in parallel planes, slidably interfitted guide means carried by the parts of said links which cross each other, to control movements of the links with relation to each other, spring means urging said links in predetermined directions with relation to each other, said links extending generally upwardly, and means for adjustably mounting a supported object upon the upper ends of said links comprising roller elements rotatably carried by the upper ends of such links, a carriage supported by and movable with respect to said roller elements and geared thereto, and releasable dogging means for preventing rotation of said roller elements to prevent movement of the carriage with relation to said links.

2. Means as set forth in claim 1 including additional guide means slidably interconnecting said carriage and the upper ends of each of said links, said dogging means enabling holding both of said rollers against movement to prevent swinging of the links, whereby when said dogging means is released the rollers are movable toward and from each other with swinging of the links, the rollers also being rotatable about their axes, to allow travel of the carriage without swinging movement of the links.

3. Means for supporting a seat or the like, comprising in combination with a suitable support, a pair of links swingable about spaced, fixed axes and crossing one another to swing substantially in a common plane in such manner that their free ends may move upwardly toward and downwardly away from one another, guide means interconnecting said links to control their relative movements, and means for adjustably mounting a supported object upon the upper ends of said links, comprising a roller element carried by the free end of each link, a carriage portion supported by and movable with respect to said roller elements and geared thereto, and dogging means for preventing rotation of said roller elements to hold the links and carriage against relative movement, said dogging means comprising a rigid locking member guided with respect to the carriage for rectilinear movement toward and from the axes of said roller elements and into and out of interlocked relation with both of such roller elements, interlocking portions being arranged upon the opposite sides of said roller elements from the geared portions which mesh with the carriage.

ANDREW L. JOHNSON.